United States Patent [19]

McGlone et al.

[11] Patent Number: 4,498,697
[45] Date of Patent: Feb. 12, 1985

[54] PORTABLE, POSITIONABLE, LOCKING MAGNETIC MOLDING TUBES FOR VEHICLE PROTECTION

[76] Inventors: William E. McGlone; Leonard J. Genest, both of P.O. Box 2759, Mission Viejo, Calif. 92691

[21] Appl. No.: 377,006

[22] Filed: Jun. 2, 1983

[51] Int. Cl.³ .............................................. B60R 19/08
[52] U.S. Cl. .................................................... 293/128
[58] Field of Search ...................... 293/128; 428/55, 31

[56] References Cited

U.S. PATENT DOCUMENTS

| | | | |
|---|---|---|---|
| 3,147,176 | 9/1964 | Haslam | 293/128 |
| 3,472,546 | 10/1969 | Samuels | 293/128 |
| 3,582,134 | 6/1971 | Shaff | 293/128 |
| 3,659,887 | 5/1972 | Marquette | 293/128 |
| 4,294,478 | 10/1981 | Marquette | 293/128 |
| 4,401,331 | 8/1983 | Ziner et al. | 293/128 |

Primary Examiner—Robert R. Song

[57] ABSTRACT

A molded plastic or rubber tube with an adhesively applied flexible magnet that can be magnetically attached to the sides of any metal vehicle for the purpose of protection against being damaged by impacts from hard objects or adjacent vehicles in a parking situation. Further, the molding can be secured to the vehicle by a wire clip that surrounds the diameter of the molding and has a projection on the magnet side of the molding that fits between the door and the door jam of a vehicle which secures the clip and therefore the molding to the vehicle when the door is closed and locked.

5 Claims, 5 Drawing Figures

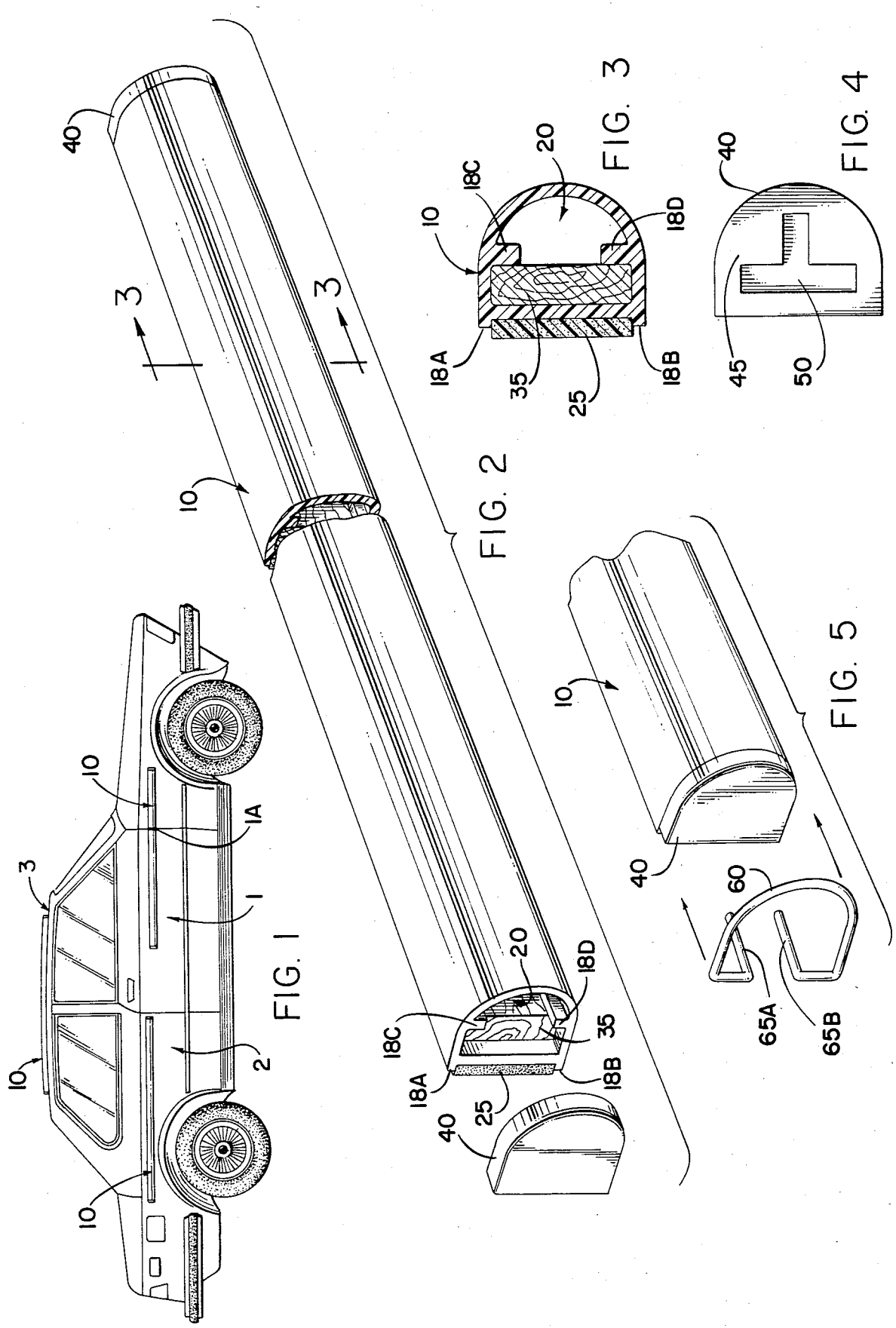

PORTABLE, POSITIONABLE, LOCKING MAGNETIC MOLDING TUBES FOR VEHICLE PROTECTION

BACKGROUND OF INVENTION

This invention relates to the protection of vehicles and particularly the paint and surface finish from damage caused by hard objects or the doors of adjacent vehicles.

Most vehicle owners have endured the anger of having their vehicles damaged as the door of an adjacent vehicle strikes the side panel of their vehicle in a parking situation. Most vehicle manufacturers do provide permanent molding strips on their vehicles which usually are positioned for style rather than function.

Inasmuch as there is no standard for door height or molding strip height, any permanently mounted molding strip will not be effective for all parking damage situations.

In order to solve this problem, people have used cardboard or foam sheets or slabs mounted with wire or magnets to try to protect their vehicles. The problem with these devices is that they are unsightly, cannot be secured to the vehicle, can be blown away with the wind, tend to deteriorate quickly from use, and often do not provide adequate impact absorbtion and dispersion qualities.

In order to overcome these problems, the present invention provides a design that does not look unsightly when mounted on a vehicle, has the ability of being locked to the side of the vehicle to prevent theft, has an internal unidirectional semi-rigid member that allows the molding to be bent to the contours of the vehicle but is rigid in its ground parallel dimension to assure that the molding will always appear straight. The internal semi-rigid member also adds additional impact absorbtion and dispersion qualities. The magnet is a soft, flexible magnet that will not damage the vehicle finish, is sufficiently strong not to be blown off by the wind or rain yet allows convenient removal for storage during vehicle motion.

Further, in accordance with the invention, the moldings may be used on top of the vehicle for carrying light loads where the moldings provide protection of the roof finish by acting as a barrier between the roof and the load.

SUMMARY OF THE INVENTION

A typical assembly in which the present apparatus and method in accordance with the invention may be utilized, includes molded or extruded material of vinyl, rubber, foam, or other resilient material to which is bonded a flexible magnet lengthwise to the molding. The assembly also incorporates an internal semi-rigid member which maintains the tubing in a straight parallel attitude when attached, and which also improves the impact-absorbtion and distribution characteristics of the tubing. The invention also provides a means for locking the protective tubing to the internal lip of the vehicle door, to prevent pilferage of the easily removeable apparatus. The present invention has no metal parts and no adhesives in contact with surfaces to be protected.

BRIEF DESCRIPTION OF DRAWINGS

FIG. 1 is a side view of an automobile showing invention attached to front and rear fenders.

FIG. 2 is longitudinal view of the invention showing componentry and general design.

FIG. 3 is a direct open end view of the invention.

FIG. 4 is an internal view of the end cap of the invention.

FIG. 5 is a partial view of the invention and its locking device.

DETAILED DESCRIPTION OF THE INVENTION

FIG. 1 depicts the present invention 10 as it may be used on an automobile; attached to a door panel 1 using Locking Device 1A, behind door flange; attached to a fender segment 2; and attached to a roof segment, 3.

FIG. 2 depicts the external and internal design structure of molding 10, and associated components. Open end of molding 10 displays internally extruded projections 18C and 18D which extend internally the full length of molding 10 and define the channel under which the internal semi-rigid member 35 resides. Air space 20 provides additional impact absorbing characteristics to the overall molding 10 and assembly. Base extensions 18A and 18B of molding 10, run the entire external length of molding 10 and form a channel into which adhesive attached vinyl magnet 25, resides. End Caps 40 are attached to each end of molding 10 and provide support for the arcuate portion of molding 10; hold internal semi-rigid member 35 in place, and seal off air space 20.

FIG. 3 is a cross section end view of molding 10. Base extensions 18A and 18B of molding 10 form the external lengthwise channel wherein resides the adhesive attached vinyl magnet 25. Internal molding projections 18C and 18D form the internal lengthwise channel wherein resides the semi-rigid member 35. The impact-absorbing air space is indicated by 20.

FIG. 4 is an inside view of end cap 40 for molding 10. End cap 40 is an injection molded plastic piece with a raised inner surface 45 and a recessed T-slot, 50. Said T-slot 50 acts as a stabilizer for the internal semi-rigid member which may rest against or in the base of T-slot 50. One end cap 40 is glued to each end of molding 10.

FIG. 5 depicts the Locking Device. Said locking device consists of a single piece of formed and coated wire defined by a retainer loop 60 and two distal locking members 65A and 65B. The locking device slips over the end cap 40 and on to molding, 10. The locking device assembly is then moved along molding 10 until positioned as desired. The locking members, 65A and 65B are then available to be slipped behind a door flange or panel edge. When door is shut and locked, clips cannot be removed; thus preventing theft of molding 10 assembly.

What is claimed:

1. A system of locking, readily positionable, impact-absorbing protective molding tube for metal vehicle body panels or other ferous surfaces; which attaches to said panels or surfaces by magnetic attraction, comprising:

an extruded tubing of a "D" channel configuration, formed of rubber or plastic which adheres to any ferous surface by means of an adhesively attached magnetic strip which is attached to the length of the molding in the underside recess of the "D" channel where said molding incorporates an internal flat semi-rigid member that maintains the molding in a straight and lateral attitude when attached to a ferous panel and also provides extra impact-absorbing and dispersion characteristics to the molding while providing adequate flexing to allow the length of the molding to follow the contour on the surface of which it is attached and a circumferential locking device consisting of a formed and coated wire retainer loop culminating in two reverse-band locking members where said locking device fits over the molding and the distally protruding locking members are then available for attachment to panel edges or the inside lip of automobile doors to prevent theft.

2. The system of claim 1, where the internal semi-rigid member is constructed to allow flexibility in the longitudinal plane perpendicular to the flat section of the D shape of the molded tube and not allow flexibility in the plane parellel to the flat section of the D shape.

3. The system of claim 2 where the internal semi-rigid member is made of a rectngular cross section straight wooden member of the approximate length of the molded tube.

4. The system of claim 3 where the rectangular cross section straight semi-rigid member is made of metal.

5. The system of claim 1 where the locking device is made from a plastic or metal material.

* * * * *